US006438005B1

(12) United States Patent
Walter

(10) Patent No.: US 6,438,005 B1
(45) Date of Patent: Aug. 20, 2002

(54) HIGH-EFFICIENCY, LOW NOISE, INDUCTORLESS STEP-DOWN DC/DC CONVERTER

(75) Inventor: William L. Walter, Lowell, MA (US)

(73) Assignee: Linear Technology Corporation, Milpitas, CA (US)

( * ) Notice: Subject to any disclaimer, the term of this patent is extended or adjusted under 35 U.S.C. 154(b) by 0 days.

(21) Appl. No.: 09/721,140

(22) Filed: Nov. 22, 2000

(51) Int. Cl.[7] ............................ H02M 3/18; H02M 3/00
(52) U.S. Cl. ............................................ 363/60; 363/62
(58) Field of Search ................................. 323/288, 282, 323/285, 281, 273, 269; 307/491, 308; 363/60, 17, 37, 80, 59, 62

(56) References Cited

U.S. PATENT DOCUMENTS 3,553,479 A 1/1971 Nelson
4,291,366 A * 9/1981 Nelson ........................ 363/17
4,415,961 A 11/1983 Harmon, Jr.
4,451,743 A 5/1984 Suzuki et al.
5,461,557 A 10/1995 Tamagawa
5,467,009 A * 11/1995 McGlinchey ............... 323/269
5,581,454 A 12/1996 Collins
5,596,489 A 1/1997 Bazes
5,973,944 A * 10/1999 Nork ........................... 363/60
5,977,755 A * 11/1999 Miki et al. .................. 323/269

* cited by examiner

*Primary Examiner*—Rajnikant B. Patel
(74) *Attorney, Agent, or Firm*—Fish & Neave

(57) ABSTRACT

A circuit and method for regulating a voltage by means of a switched capacitor circuit including multiple switches and capacitors. The circuit is operable in a plurality of modes that match the power transferred by the switched capacitors to the power drawn by a load. Advantageously, the circuit and method increase the efficiency of the regulator circuit over varying input voltage levels and output current levels. In addition, the circuit provides lower output ripple than conventional charge pumps.

20 Claims, 2 Drawing Sheets

HIGH-EFFICIENCY, LOW NOISE, INDUCTORLESS STEP-DOWN DC/DC CONVERTER

The present invention relates to switching regulator circuits, and more particularly, to circuits and methods for maintaining high efficiency and low noise over broad current ranges in an inductorless, step-down, switching regulator circuit.

BACKGROUND OF THE INVENTION

There are three important trends affecting the electronics industry: device miniaturization, declining supply voltages, and an increasing use of battery-power. These trends place great demands on power supply circuitry in miniature, battery powered, electronic devices, such as cellular telephones and personal digital assistants (PDA's). Miniaturization places limits on circuit size; a reduced supply voltage places stringent requirements on reducing supply ripple to provide adequate noise immunity for integrated circuits; and reliance on battery-power drives a need for high efficiency for prolonged battery life.

The purpose of a voltage regulator is to provide a predetermined and constant output voltage to a load from a poorly-specified or fluctuating input voltage source. Series regulators and switching regulators are two common types of voltage regulators. Low drop out ("LDO") series regulators provide good regulation with very low noise, however, the current supply from the regulated output comes directly from the voltage source. Thus, the best efficiency possible from a LDO regulator is the ratio of the output voltage to the supply voltage which drops rapidly for supply voltages much larger than the output voltage.

Switching regulators are generally more efficient than series regulators. A switching regulator employs one or more switches (e.g., a power transistor) coupled either in series and/or parallel with the load. A control circuit turns the switches ON and OFF to transmit power to the output in discrete current pulses. An energy storage element, such as an inductor or capacitor, is used to convert the switched current pulses into a steady load current. Because inductors tend to be large components, switched capacitor converters are preferred in miniaturized devices.

In a conventional switched capacitor regulator, a capacitor is charged from the input voltage during a first part of a switch cycle and the charge is transferred to the output during a second part of the switch cycle. This cycle by cycle transfer of charge to the output produces ripple on the output. Furthermore, because charge is transferred during only a portion of a switch cycle, the regulator must be designed to supply much more charge per cycle than is typically required at the output. This can result in output ripple becoming unacceptably large under certain conditions. A couple hundred mV of ripple is not uncommon.

A feedback loop may be provided to regulate the output voltage by controlling operation of the switches to regulate the rate at which charge is transferred to the output. In a first type of switched capacitor regulator, the duration of a portion of the switching cycle is kept constant while the duration of the remaining portion of the switching cycle is changed. For example, the length of time during which charge is transferred to the output may be kept constant, while the length of time during which the capacitor is charged from the input is varied. This has the side effect of causing the frequency of a switching cycle to vary as a function of the output current. Because output ripple frequency is determined by the switching frequency, it too varies as a function of the output current making filtering the ripple more difficult.

In an alternative type of switched capacitor regulator, the duty cycle of a switching cycle is changed without changing the switching frequency. Constant frequency switched capacitor regulators generally provide lower output noise than variable frequency switching regulators by transferring only the amount of current necessary to keep the output in regulation on a cycle by cycle basis.

When a constant frequency switched regulator is supplying close to its rated output current, the efficiency of the overall circuit can be high. However, the efficiency is a function of output current and typically decreases at low output current due to the losses associated with operating the switching regulator. These losses include, among others, quiescent current losses in the control circuitry of the regulator, switch losses, switch driver current losses and the like.

It would therefore be desirable to provide DC/DC converter circuitry having high-efficiency.

It would also be desirable to provide DC/DC converter circuitry having low output voltage ripple.

It would also be desirable to provide DC/DC converter circuitry having an output voltage ripple with a substantially constant frequency.

In addition, it would be desirable to maintain high efficiency over broad current ranges, including low output currents, in a switching regulator circuit.

SUMMARY OF THE INVENTION

It is therefore an object of the present invention to provide DC/DC converter circuitry having high-efficiency.

It is also an object of the present invention to provide DC/DC converter circuitry having low output voltage ripple.

It is also an object of the present invention to provide DC/DC converter circuitry having an output voltage ripple with a substantially constant frequency.

In addition, it is an object of the present invention to maintain high efficiency over broad current ranges, including low output currents, in a switching regulator circuit.

These and other objects and advantages of the invention are provided by a switched capacitor converter having a number of switches and capacitors. The converter is operable in different modes to provide different step-down conversion ratios. Mode control circuitry selects the step-down conversion ratio to optimize efficiency as input voltage and load conditions vary.

BRIEF DESCRIPTION OF THE DRAWINGS

The above and other objects and advantages of the present invention will be apparent upon consideration of the following detailed description, taken in conjunction with the accompanying drawings, in which like reference characters refer to like parts throughout, and in which.

DETAILED DESCRIPTION OF THE INVENTION

Figure 1:
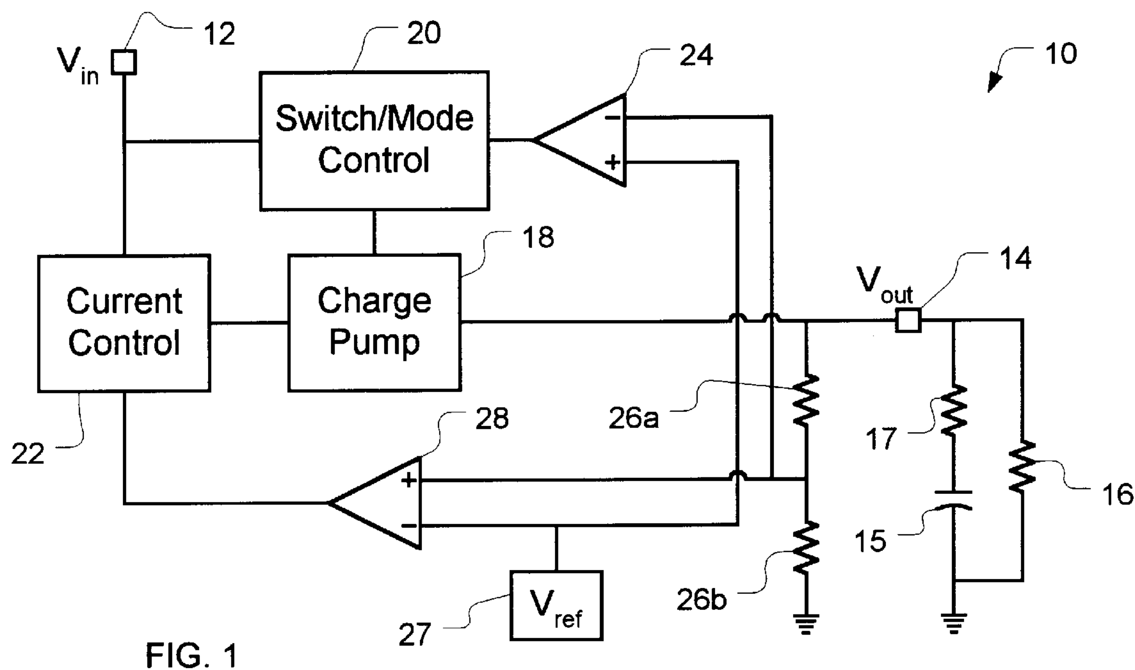
FIG. 1 is a simplified block diagram of a switching regulator circuit of the present invention.

Referring first to FIG. 1, circuit 10 accepts an input voltage, $V_{IN}$, at terminal 12 and provides a regulated DC output voltage, $V_{OUT}$, at terminal 14 for driving load 16. For example, load 16 may be cellular telephone circuitry requiring a 1.5 volt regulated supply and $V_{IN}$ may comprise a 3.6 volt battery. Circuit 10 includes step-down charge pump 18, mode control circuit 20, and current control circuitry 22. In addition, circuit 10 includes resistors 26*a* and 26*b*, voltage reference 27, and amplifiers 24 and 28 to provide feedback to mode control circuitry 20 and current control circuitry 22

To reduce ripple in the output voltage, an output capacitor 15 is often connected to output terminal 14. Typically, capacitor 15 has a large value to keep output ripple low. Resistor 17 represents the effective series resistance of capacitor 15. Although not shown in FIG. 1, additional resistors or capacitors may be used to further filter the output voltage and reduce ripple. As is known in the art, the values of these components must be considered when designing a feedback loop for the regulator circuit of FIG. 1.

Typically, a switched capacitor regulator is constructed using an integrated circuit controller with a few external components. The LT1054 Switched Capacitor Voltage Converter with Regulator, sold by Linear Technology Corporation, Milpitas, Calif., is such an integrated circuit controller for a switched capacitor converter and regulator. With the addition of external components, such as capacitors, resistors, diodes, or transistors, the LT1054 may be used to create many different types of voltage converters. For example, the data sheet for the LT1054, which is incorporated herein by this reference, includes sample circuits for voltage doublers, voltage inverters, voltage converters, and a digitally programmable voltage supply.

Figure 2:
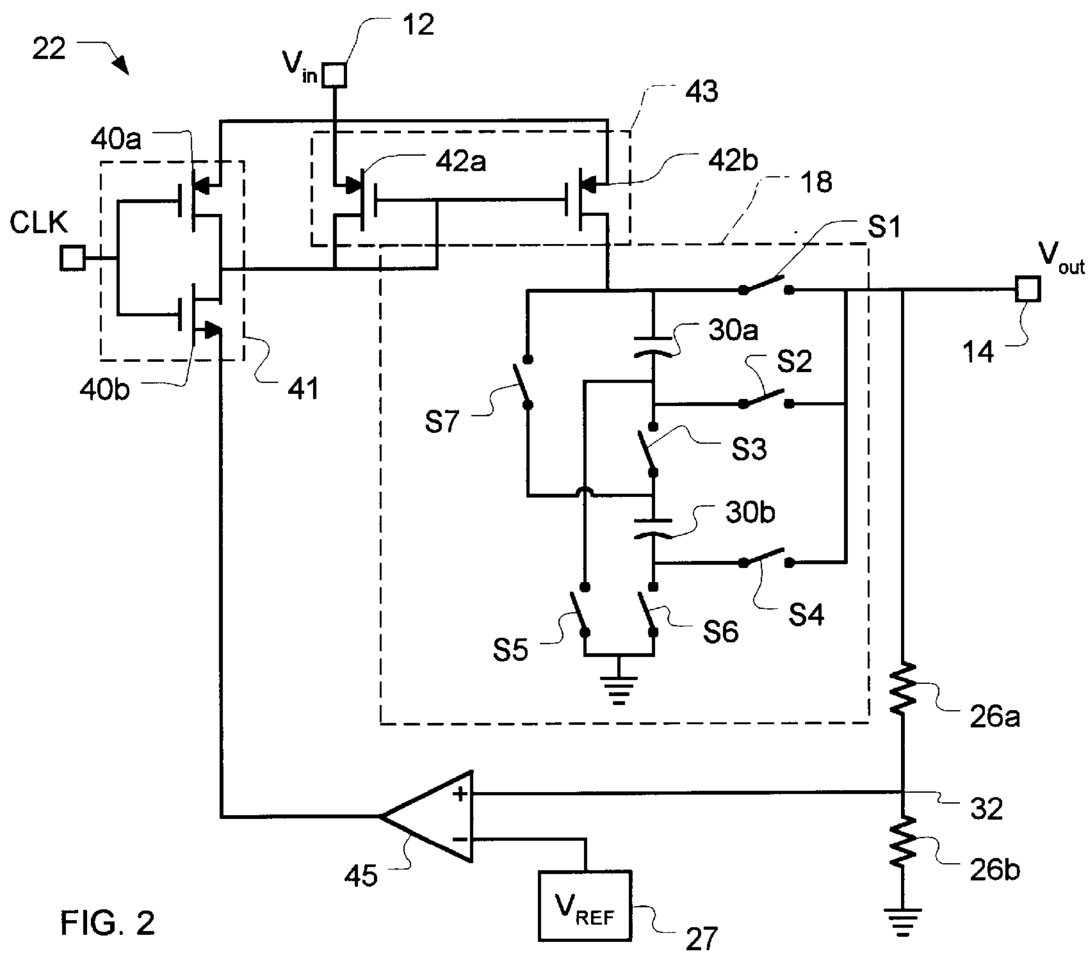
FIG. 2 is a simplified schematic of the step-down charge pump and current control circuitry of FIG. 1.

Referring now to FIG. 2, step-down charge pump 18 comprises a number of capacitors and switches coupled between input terminal 12 and output terminal 14. The switches are operated in a predetermined sequence to transfer charge from a voltage source at input terminal 12 to the capacitors and then from the capacitors to the output at output terminal 14. In accordance with the principles of the present invention, the switches are operated so as to control the amount of charge transferred from input terminal 12 to output terminal 14 and thereby regulate the output voltage.

Exemplary step-down charge pump 18 includes capacitors 30*a* and 30*b* and switches S1–S7. Preferably, switches S1–S7 are MOSFET transistors although other types of switches may be used. Also shown in FIG. 2 are MOSFETs 40*a* and 40*b* configured as an inverter 41 and MOSFETs 42*a* and 42*b* configured as a current mirror 43.

In accordance with the principles of the present invention, step-down charge pump 18 may be operated in different modes, wherein a mode of operation is selected to improve the efficiency of the switched capacitor regulator.

In a first mode of operation, referred to herein as a "1-to-1"mode, switches S2–S7 are kept open, and switch S1 is closed. A clock signal, CLK, is applied to the gates of MOSFETs 40*a* and 40*b*. When the clock signal is HIGH, MOSFET 40*a* is turned OFF and MOSFET 40*b* is turned ON. Transconductance amplifier 45 sinks current from $V_{IN}$ at input terminal 12 through MOSFETs 42*a* and 40*b*. Because MOSFETS 42*a* and 42*b* are configured as current mirror 43, MOSFET 42*b* conducts a current approximately equal to the current through MOSFET 42*a* multiplied by the current mirror gain factor. This current is supplied via switch S1 and output terminal 14 to the output, including output capacitor 15 and load 16.

When the clock signal, CLK, is LOW, MOSFET 40*a* turns ON and MOSFET 40*b* turns OFF, causing MOSFETs 42*a* and 42*b* to turn OFF. As a result, no current flows through MOSFET 42*a* or 42*b*. Load current is supplied from output capacitor 15.

A voltage divider formed from resistors 46*a* and 46*b* provides a voltage at node 32 proportional to the output voltage $V_{OUT}$. The output of transconductance amplifier 45 is a function of the difference between the voltage at node 32 and the reference voltage, $V_{REF}$. When the voltage at node 32 is less than $V_{REF}$, indicating that the output voltage is low, transconductance amplifier 45 sinks more current from MOSFETS 40*b* and 42*a* when clock signal CLK is LOW. Because of the current mirror configuration of MOSFETS 42*a* and 42*b*, MOSFET 42*b* provides increased current to the output, thereby raising the output voltage, $V_{OUT}$. Conversely, when the voltage at node 32 is higher than $V_{REF}$, transconductance amplifier 45 sinks less current when the clock signal is LOW and MOSFET 42*b* provides reduced current to the output, thereby lowering $V_{OUT}$.

When regulating, the voltage regulator of the present invention operates so that the average current supplied by current mirror 43 is equal to the average output current. In this mode of operation $V_{OUT}$ is less than $V_{IN}$ by the voltage drops across switch S1 and MOSFET 42*b* due to the output current. The regulator has an effective output impedance given by:

$$R_{out} = GM \times N \times \frac{R_{46b}}{R_{46a} + R_{46b}} \times DC \quad (1)$$

where:

GM is the gain of transconductance amplifier 45,

N is the mirror gain factor for current mirror 43,

R46*a* and R46*b* are the values of resistors 46*a* and 46*b*, respectively, and DC is the duty cycle of the clock signal.

The mode of circuit operation just described is referred to as 1-to-1 mode because the ratio of average input current to average output current is about 1 to 1 when the output voltage is being regulated. In a second mode of operation, step-down charge pump 18 operates in a "3-to-2" mode wherein the average input current is approximately two-thirds (⅔) the average output current. In the 3-to-2 mode, switches S1–S7 are controlled so that switches S1, S3, and S6 are ON and switches S2, S4, and S7 are OFF when the clock signal (CLK) is LOW. Conversely, switches S1, S3, and S6 are OFF and switches S2, S4, and S7 are ON when the clock signal is HIGH. Switch S5 remains OFF.

When CLK is HIGH, the current output of amplifier 45 is amplified by current mirror 43 which supplies current to $V_{OUT}$. Current mirror 43 also supplies current to capacitors 30*a* and 30*b* which are effectively connected in parallel between MOSFET 42*b* and output terminal 14. When CLK goes LOW, capacitors 30*a* and 30*b* are connected in series between output terminal 14 and ground, and the charge stored on the capacitors is transferred to the output. Because current flows during both halves of a CLK cycle the efficiency of step-down converter 18 is improved.

In the 3-to-2 mode of operations, when the output voltage is being regulated, the average current through MOSFET 42*b* equals two-thirds (⅔) the average output current. Because the average input current is less than the average input current in 1-to-1 mode, the efficiency of the regulator is improved when the voltage regulator can be operated in the 3-to-2 mode. Losses in MOSFET 42*b* and switches S1–S7, and the required load current, determine how low $V_{IN}$ may be with respect to $V_{OUT}$ while maintaining adequate voltage regulation in 3-to-2mode. However, when $V_{IN}$ is greater than about 1.5×$V_{OUT}$ the circuitry of FIG. 2 may be operated in 3-to-2 mode for improved efficiency.

The effective output impedance of switched capacitor step-down charge pump 18 in the 3-to-2 mode of operation is given by:

$$R_{out} = \frac{3}{4} \times GM \times N \times \frac{R_{46b}}{R_{46a} + R_{46b}} \tag{2}$$

To achieve a further improvement in efficiency, switched capacitor step-down charge pump 18 may also be operated in a "2-to-1" mode when $V_{IN}$ is greater than about twice $V_{OUT}$. In the 2-to-1 mode, switches S1 and S5 are ON and switch S2 is OFF when CLK is LOW, and switches S1 and S5 are OFF and switch S2 is ON when CLK is HIGH. Switches S3–S4, and S6–S7 are kept off. When CLK is LOW, current flows from $V_{IN}$ to $V_{OUT}$ through MOSFET 42*b* and switch S1. Current is also provided to charge capacitor 30*a*. When CLK goes high, the charge stored on capacitor 30*a* is transferred to $V_{OUT}$ at output terminal 14. The effective output impedance of switched capacitor step-down charge pump 18 in the 2-to-1 mode of operation is given by:

$$R_{out} = GM \times N \times \frac{R_{46b}}{R_{46a} + R_{46b}} \tag{3}$$

Figure 3:
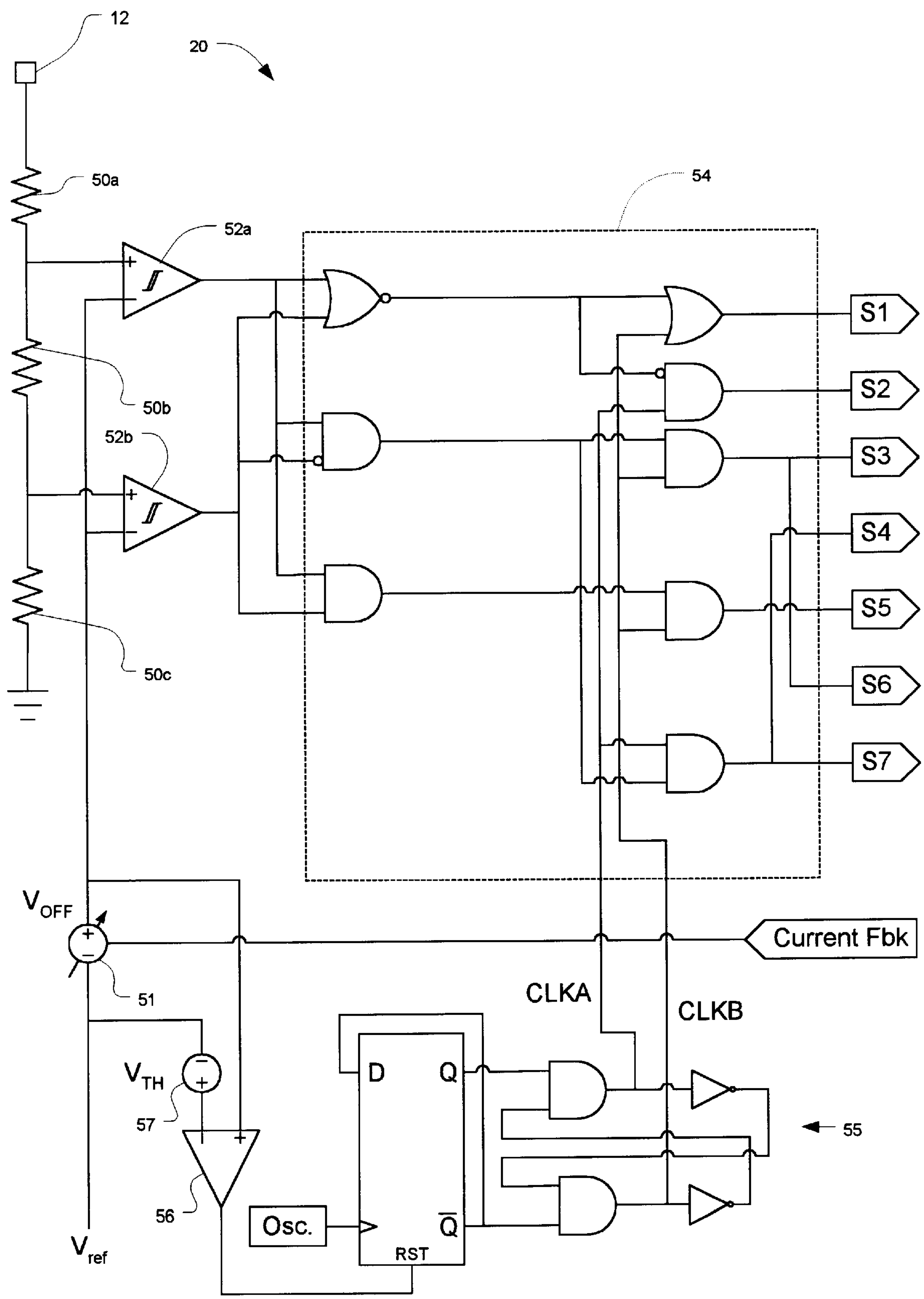
FIG. 3 is a simplified schematic of the switch/mode control circuitry of FIG. 1.

A regulator according to the principles of the present invention is operable in a plurality of modes, e.g., 1-to-1 mode, 3-to-2 mode, or 2-to-1 mode, to provide improved operating efficiency over a wide range of input voltages. The optimum mode of operation is determined by the ratio of the input and output voltages, e.g., $V_{IN}$ to $V_{OUT}$, as well as, by switch losses and the actual output current. In one embodiment of a regulator in accordance with the principles of the present invention, a specific mode of operation may be preselected and fixed by a circuit designer by appropriately biasing configuration pins on a regulator controller integrated circuit. However, in a preferred embodiment of the present invention, the optimum mode of operation is automatically determined by switch/mode control circuitry 20 of FIG. 1. FIG. 3 is a schematic representation of an illustrative implementation of switch/mode control circuit 20.

Switch/mode control circuitry 20 includes resistors 50*a*–50*c* and comparators 52*a* and 52*b*. Resistors 50*a*–50*c* form a voltage divider network that provides voltage signals for determining the most efficient mode of operation of regulator circuit 10. The voltage signals are provided to inputs of corresponding comparators 52*a* and 52*b*. The other input to comparators 52*a* and 52*b* is provided by reference voltage, $V_{REF}$ in series with an offset voltage 51 ($V_{OFF}$) that is proportional to the output current load. Resistors 50*a*–*c* are chosen so that one or both of comparators 52*a* and 52*b* will be on at the appropriate voltages on input 12. Specifically, both comparators are off when $$V_{IN} < (V_{REF} + V_{OFF}) \times \left(1 + \frac{R_{50a}}{R_{50b} + R_{50c}}\right)$$

which corresponds to the conditions under which the regulator should be operated in 1-to-1 mode. When $$V_{IN} \geq (V_{REF} + V_{OFF}) \times \left(1 + \frac{R_{50a} + R_{50b}}{R_{50c}}\right)$$

both comparators are on; which corresponds to the conditions in which the regulator should be operated in 2-to-1 mode. For intermediate input voltages, comparator 52*a* is off and comparator 52*b* is on, indicating that a 3-to-2 mode of operation would be most efficient.

However, as described previously, the optimal mode of operation is dependent not only on the input and output voltages, but also on voltage drops caused by the on resistance of switches S1 through S7 and the average load current. This variation is taken into account by offset voltage 51 ($V_{OFF}$) which is a function of the current feedback signal. The function is set to optimize the mode switching point for any given load condition. As the load current increases, the current feedback signal and the offset voltage also increase. This raises the input voltage at which the operational mode of regulator 10 changes from 1-to-1 mode, to 3-to-2 mode, and then to 2-to-1 mode.

Exemplary switching logic circuitry 54 combines the mode signals provided by comparators 52*a* and 52*b* with timing signals, CLKA and CLKB, to operate switches S1–S7 according to the proper mode of operation. For example, when comparators 52*a* and 52*b* are both off, switching logic circuitry 54 provides a signal turning switch S1 ON. This corresponds to the 1-to-1 mode of operation. Otherwise, if one or both of comparators 52*a* and 52*b* are OFF, switch S1 is driven by the CLKB signal. Switches S2–S7 are controlled by switching logic circuitry 54 in an analogous manner.

Non-overlap clock generator 55 produces the clock signals CLKA and CLKB, such that there is a "blanking"period from one signal going low to the other signal going high. A blanking period is desirable to ensure that operation of switches S1–S7 do not result in shorting the switching nodes together, such as the output voltage, $V_{OUT}$, to ground. There are many means of designing a non-overlap clock generator, such as non-overlap clock generator 55, to ensure that all switches are turned off prior to turning any switches on, as one skilled in the art would know. Preferably, the CLKA signal is also used as the CLK signal of FIG. 2.

Connected to the reset signal of the non-overlap clock generator 55, is comparator 56. When the output of comparator 56 is high, the non-overlap clock generator operates as described previously. When the output of comparator 56 is low, the clock generator is forced into a static state, where the signal CLKA is held low. If signal CLKA is held low, no switching of switches S1–S7 takes place, which stops the charge transferred from the input 12 to the output 14. By stopping the switching and shutting down portions of the regulator circuit, efficiency at low output currents can be significantly improved. Comparator 56 goes low when the current feedback offset voltage 51 drops below a threshold voltage 57, signaling a light output load, which disables the switching as described above. As the output load 16 discharges capacitor 15, the output will drop, and the current feedback voltage will rise eventually causing the output of comparator 56 to return high, enabling the clock circuit 55 and charge transfer. This is similar to the operation of a conventional regulator, but unlike a conventional regulator, the amount charge transferred when coming out of burst mode is set by the threshold of comparator 56, effectively limiting the amount of charge transferred, which in turn limits the size of the output ripple voltage. Thus, a means for improved efficiency at light loads is achieved without producing excessive output ripple.

Additionally there are many means for providing output short circuit or over current protection. One simple means is to limit the amount of current the transconductance amplifier 45 can sink. By limiting of the amount of current sunk by transconductance amplifier 45, the current out of mirror transistor 42*b* is limited which in turn limits the effective output current. There are many means by which this may be accomplished as one skilled in the art would know.

Thus, an inductorless DC/DC regulator circuit and a method for maintaining high efficiency over broad current ranges has been provided. One skilled in the art will appreciate that the present invention can be practiced by other than the described embodiments, which are presented for purposes of illustration and not of limitation, and the present invention is limited only by the claims which follow.

What is claimed is:

1. A switched capacitor voltage regulator, the regulator comprising:

charge pump circuitry coupled to an output of the regulator, the charge pump circuitry including a plurality of capacitors and a plurality of switches;

current control circuitry coupled between an input of the regulator and the charge pump circuitry, for controlling current flow into the charge pump circuitry responsive to a voltage at the output of the regulator; and switch control circuitry coupled to the input of the regulator and to the charge pump circuitry for controlling the charge pump circuitry so that the plurality of switches are operated responsive to a voltage at the input.

2. The switched capacitor voltage regulator of claim 1 wherein the charge pump circuitry comprises:

at least two capacitors; and a plurality of switches coupled to the capacitors, so that the capacitors may be electrically coupled to the input, to the output, to ground, or to each other.

3. The switched capacitor voltage regulator of claim 2 wherein the switches are operable in a plurality of modes to transfer energy from the input to the output.

4. The switched capacitor voltage regulator of claim 3, wherein the switch control circuitry operates the switches so that a ratio of the input current to the output current has a predetermined ratio.

5. The switched capacitor voltage regulator of claim 4, wherein the switch control circuitry operates the switches responsive to a current at the output.

6. The switched capacitor voltage regulator of claim 5, wherein the plurality of switches includes at least seven switches.

7. The switched capacitor voltage regulator of claim 1 further comprising:

a first capacitor having a first terminal coupled to the Current Control Circuitry;

a first switch coupled between first terminal of the first capacitor and the output of the regulator;

a first switch coupled between the input and the output of the regulator;

a first capacitor having a first terminal coupled to the input of the regulator;

a second switch coupled between a second terminal of the first capacitor and the output of the regulator;

a second capacitor;

a third switch coupled between the second terminal of the first capacitor and a first terminal of the second capacitor;

a fourth switch coupled between a second terminal of the second capacitor and the output of the regulator;

a fifth switch coupled between the second terminal of the first capacitor and a common node;

a sixth switch coupled between the second terminal of the second capacitor and the common node; and a seventh switch coupled between the current control circuitry and the first terminal of the second capacitor.

8. The switched capacitor voltage regulator of claim 7 wherein the switch control circuitry causes the first switch to close and the second through seventh switches to remain open.

9. The switched capacitor voltage regulator of claim 7, wherein the switch control circuitry causes the first, second, third, fourth, sixth and seventh switches to alternately open and close, and the fifth switch to remain open.

10. The switched capacitor voltage regulator of claim 9, wherein the switch control circuitry causes the first, third, and sixth switches to open and closed together and the second, fourth and seventh switches to open and close together, such that the first, third, and sixth switches are operated out of phase with the second, fourth and seventh switches.

11. The switched capacitor voltage regulator of claim 7, wherein the switch control circuitry causes the first, second, and fifth switches to open and close, wherein the first and fifth switches cycle together and the second switch cycles out of phase with the first and fifth switches.

12. The switched capacitor voltage regulator of claim 1, wherein the charge pump circuitry comprises a plurality of capacitor and a plurality of switches; and wherein the switch control circuitry coupled operates the switches responsive to an voltage at an input of the regulator.

13. The switched capacitor voltage regulator of claim 12, wherein the switch control circuitry includes voltage sensing circuitry and logic circuitry.

14. The switched capacitor voltage regulator of claim 13, wherein the voltage sensing circuitry comprises:

a plurality of resistors configured as a voltage divider coupled to the input of the regulator;

a reference voltage; and a plurality of comparators each having a first input coupled to corresponding nodes in the voltage divider and a second input coupled to the reference voltage, so that the comparators provide signals indicative of the voltage at the input of the regulator.

15. The switched capacitor voltage regulator of claim 14, wherein the logic circuitry is coupled to the outputs of the plurality of comparators, the logic circuitry determining the timing and sequence in which the plurality of switches are open and shut.

16. The switched capacitor voltage regulator of claim 14, wherein the voltage sensing circuitry further comprises a variable voltage source coupled between the reference voltage and the comparators.

17. The switched capacitor voltage regulator of claim 16, further comprising a current feedback circuit for providing a signal indicative of a load current; the variable voltage source providing a voltage responsive to the feedback signal, so that switching points of the comparators depends on the feedback signal.

18. The switched capacitor voltage regulator of claim 17, where in the current feedback circuit for providing a signal indicative of a load current further provides a signal which indicates that the load current has dropped below a predetermined value.

19. The switched capacitor voltage regulator of claim 18, where in the signal which indicates that the load current has dropped below a determined value is used to disable all switching such that charge transfer is also stopped.

20. A circuit comprising:

an input node for accepting an input voltage;

an output node for providing an output voltage;

a plurality of capacitors;

a plurality of switches, the plurality of switches and the plurality of capacitors coupled between the input node and the output node;

an output current feedback circuit coupled to the output node;

a current control circuit coupled to the output current feedback circuit and between the input and output nodes, the current control circuit controlling the average current from the input node;

a mode control circuit coupled to the input node and the output current feedback circuit; and a switch control circuit coupled to the input node, the output node, the mode control circuit, and the plurality of switches, wherein the switch control circuit operates the plurality of switches in one of a plurality of operating modes responsive to the mode control circuit.

* * * * *

UNITED STATES PATENT AND TRADEMARK OFFICE

CERTIFICATE OF CORRECTION

PATENT NO. : 6,438,005 B1
DATED : August 20, 2002
INVENTOR(S) : William L. Walter It is certified that error appears in the above-identified patent and that said Letters Patent is hereby corrected as shown below:

Column 1,
Line 28, change "," to -- ; -- after "noise"

Column 5,
Line 50, insert -- , -- after "$V_{REF}$"
Line 61, change "≥" to -- ≳ --

Column 6,
Line 57, insert -- of -- after "amount"

Column 8,
Line 13, change "closed" to -- close --
Lines 57 and 62, change "where in" to -- wherein --

Signed and Sealed this

First Day of July, 2003

JAMES E. ROGAN
*Director of the United States Patent and Trademark Office*